United States Patent [19]

Ikeda et al.

[11] 4,337,953
[45] Jul. 6, 1982

[54] SEALING DEVICE WITH SEAL LIPS FORMING V-SHAPE

[75] Inventors: Hideo Ikeda, Fujisawa; Masao Teraoka, Sano; Junzo Ishimaru, Hiratsuka, all of Japan

[73] Assignees: Nissan Motor Co., Ltd.; Keeper Co., Ltd., both of Japan

[21] Appl. No.: 128,019

[22] Filed: Mar. 7, 1980

[30] Foreign Application Priority Data

Mar. 13, 1979 [JP] Japan .................................. 54-28891

[51] Int. Cl.³ .............................................. F16J 15/32
[52] U.S. Cl. .................................... 277/152; 277/183;
277/207 R; 180/254; 301/124 H
[58] Field of Search ..................... 277/30, 84, 95, 166,
277/152, 153, 182–184, 165, 186, 207 A, 207 R,
12; 301/124 H; 180/254; 64/32 R, 32 F

[56] References Cited

U.S. PATENT DOCUMENTS

| | | | |
|---|---|---|---|
| 1,268,208 | 6/1918 | Boyd | 180/254 |
| 1,394,184 | 10/1921 | Morse | 64/32 R |
| 2,071,198 | 2/1937 | Chambers | 277/182 X |
| 2274234 | 2/1942 | Ekkebus et al. | |
| 2,547,185 | 4/1951 | von Bolhar | 277/207 X |
| 2,571,015 | 10/1951 | Columbus | 277/207 X |
| 2,685,184 | 8/1954 | Nador et al. | 64/32 R |
| 2,868,566 | 1/1959 | Kosatka | |
| 2,879,114 | 3/1959 | Bowen | 277/183 X |
| 2,929,232 | 3/1960 | Muller | 64/32 R |
| 3,075,370 | 1/1963 | Kings | 64/32 |
| 3,396,975 | 8/1968 | Otto | 277/153 X |
| 3,640,540 | 2/1972 | Larson | 277/95 X |
| 3,848,938 | 11/1974 | Stella et al. | 308/36.1 |
| 4,077,656 | 3/1978 | Swindler | 277/207 R X |
| 4,129,345 | 12/1978 | Krude | 64/32 R X |

FOREIGN PATENT DOCUMENTS

| | | |
|---|---|---|
| 890152 | 9/1953 | Fed. Rep. of Germany . |
| 830424 | 5/1938 | France . |
| 1125730 | 7/1956 | France .................. 277/183 |
| 546260 | 7/1942 | United Kingdom ........ 277/182 |
| 599410 | 3/1948 | United Kingdom . |
| 2027820 | 2/1980 | United Kingdom . |
| 1568682 | 6/1980 | United Kingdom . |

*Primary Examiner*—Robert S. Ward, Jr.
*Attorney, Agent, or Firm*—Thompson, Birch, Gauthier & Samuels

[57] ABSTRACT

A sealing device has a single rubber seal member provided with two oppositely directed seal lips which form a V-shaped cross-section and which are in contact with a spherical surface. Grease is filled in the V-shaped space. A portion of an outer fitting member protrudes inwardly to hold the seal member in place.

8 Claims, 3 Drawing Figures

SEALING DEVICE WITH SEAL LIPS FORMING V-SHAPE

BACKGROUND OF THE INVENTION

The present invention relates to a sealing device to protect a knuckle flange portion of a drive shaft of a front drive vehicle or the like from foreign material e.g. muddy water, and more particularly, to a sealing device including at least one annular seal member made of an elastic material, e.g. rubber, which is held between a pair of fitting members to slidably contact with a spherical outer surface of an opposing member at the inner periphery of the seal member.

On example of such a conventional sealing device is shown in FIG. 1. A front drive shaft 1 drives a front axle 3 through a homo-kinetic universal joint 21. A trunnion socket 2 rotatably supporting the front drive shaft 1 has a spherical portion 2a which covers the left half of the universal joint 21 located at the right end of the socket 2. A knuckle spindle 4 which supports the front drive shaft 3 is secured to a steering knuckle 5 by means of bolts. The steering knuckle 5 has a knuckle flange 5a at its left end and is provided with king pins 6 at diametrically opposite upper and lower portions. The king pins 6 are connected with the spherical surface portion 2a of the trunnion socket 2 through taper roller bearings 7, permitting the steering knuckle 5 to rotate about the axis of the king pins 6. A front hub 8 rotates with the front axle 3 and is to mount thereon a brake drum and a wheel disc, not shown.

When the vehicle is to be steered, a steering wheel (not shown) is operated by which the steering knuckle 5 rotates about the king pins 6. Thus, the knuckle spindle 4, front axle 3 and front hub 8 also rotate with the steering knuckle 5 about the slanted axes of the king pins 6 to effect steering of the wheel disc.

The conventional sealing device shown in FIG. 1 includes a first fitting member 9 which is an annular metal disc, and an annular packing 10 made of rubber, both being received in an annular recess of the end surface of the knuckle flange 5a of the steering knuckle 5. On the outer surface of the rubber packing 10, a seal member 11 made of felt, and a second fitting member 12 which is also an annular metal disc are superimposed and secured to the end surface of the knuckle flange 5a by bolts 13. As the sealing device is assembled from the free end of the spherical surface portion 2a of the trunnion socket 2, the fitting members 9 and 12 and the seal member 11 have slits respectively to enlarge the inner diameters to pass the largest outer periphery of the spherical surface portion 2a. Thus, foreign materials, e.g. muddy water are liable to enter into the inner space through the slit of the seal member 11. Also, as two seal members 10 and 11 are used, assembly is not simple. Further, the seal member 11 made of felt wears prematurely. In place of two seal members 10 and 11, a single rubber seal member of increased thickness may be used. However, the contact edge of such a seal member tends to flutter by mutual sliding resistance between the contact edge and the spherical surface 2a to impair the sealing and anti-wear properties.

SUMMARY OF THE INVENTION

Accordingly, the object of the present invention is to eliminate the above-mentioned disadvantages and to provide an improved sealing device which has superior sealing and wear resistant properties and which can be simply assembled.

According to the present invention, the sealing device is characterized in that the annular seal member includes at its inner periphery two seal lips forming a generally V-shaped cross-section, which contact with the outer spherical surface of the opposing member, the two seal lips and the outer spherical surface defining a space to be filled with grease, and that the radially inner portion of the outer fitting member protrudes inwardly toward the inner fitting member to prevent the seal member from moving radially inwardly.

By forming the two seal lips which are directed oppositely with each other, and filling the space between the seal lips with grease, the sealing device according to the present invention effectively seals the inner space from entry of foreign material and prevents leakage of the grease for sufficiently long period to maintain desired sliding contact between the seal lips and the spherical surface without accompanying undesired turnover or flutter of the edges of the seal lips. Further, by holding the seal member in place, by means of the outer fitting member, the seal member maintains a desired position even when sliding resistance between the seal lips and the outer spherical surface is large enough to pull the seal member.

According to a preferred embodiment of the present invention, the annular seal member is provided with at least one annular projection on its outer surface which contacts with the outer fitting member.

When the outer fitting member is urged against the annular seal member, deformation of the annular seal member is absorbed by the aforesaid projection and the main body of the annular seal member is not deformed. Thus, the seal lips are not displaced from the desired position so that the sealing property of the seal lips is not impaired.

Other features and advantages of the present invention will become apparent by reference to the following description and to the drawings.

DETAILED DESCRIPTION OF A PREFERRED EMBODIMENT

Figure 1:
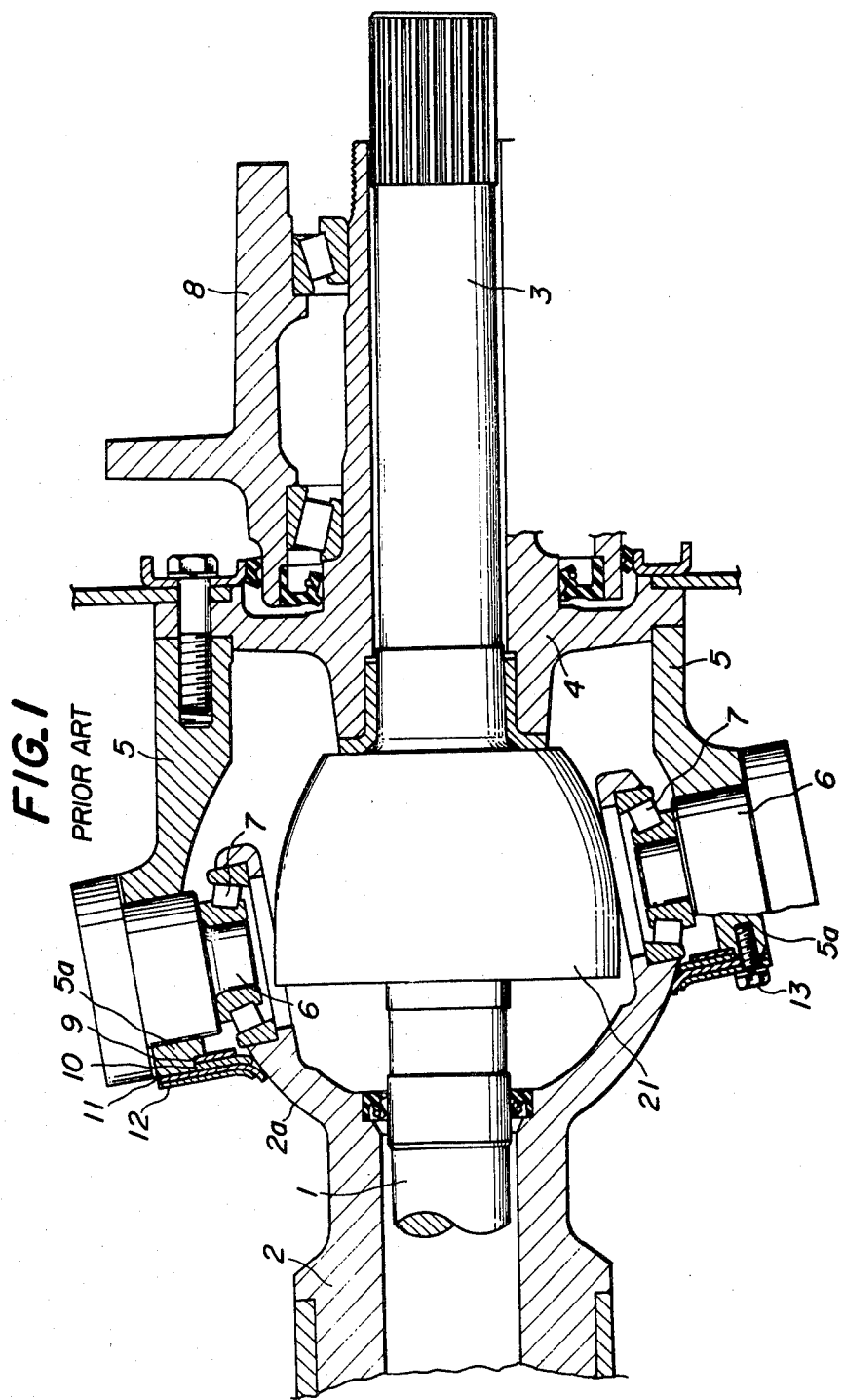
FIG. 1 is a cross-sectional view of a conventional sealing device which is mounted on a knuckle flange of a front drive shaft.
Figure 2:
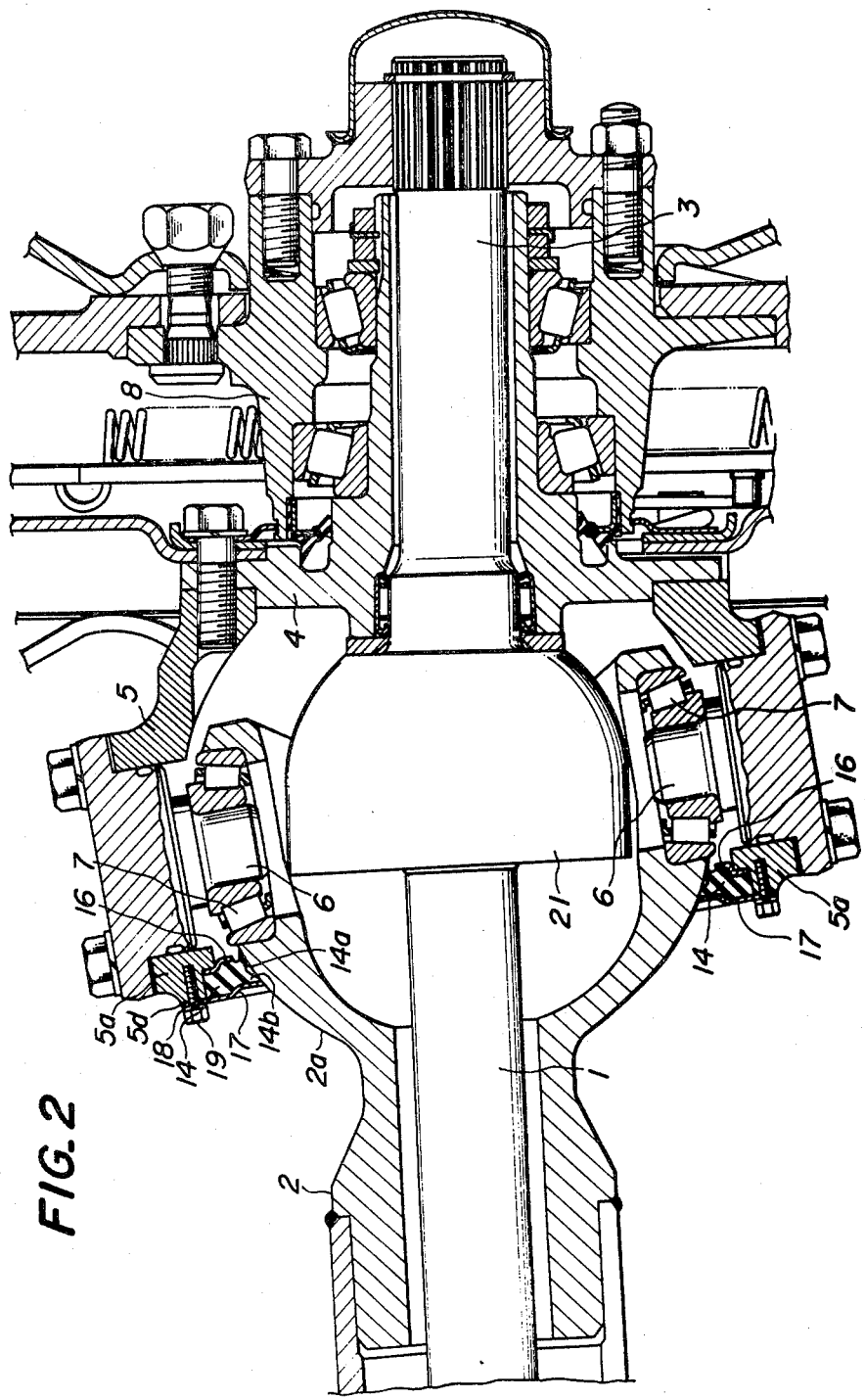
FIG. 2 is a cross-sectional view of a sealing device, according to the present invention, which is mounted on the knuckle flange similar to that shown in FIG. 1.

Referring now to FIG. 2, there is shown a front axle portion of the vehicle which is essentially the same as that shown in FIG. 1. Identical reference numerals are used to show identical or corresponding parts or portions shown in FIG. 1, and the following detailed description is limited only to the sealing device according to the present invention.

Figure 3:
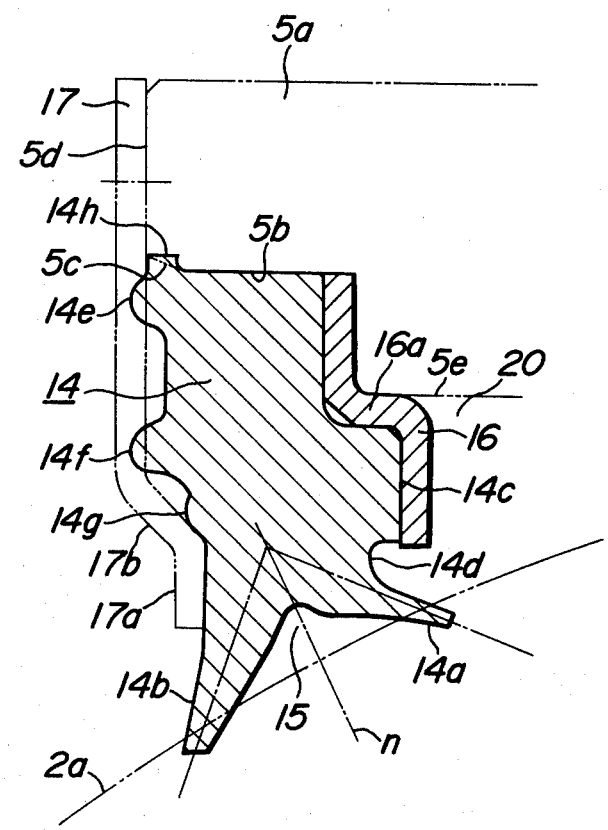
FIG. 3 is an enlarged cross-sectional view of the sealing device shown in FIG. 2.

As shown in FIGS. 2 and 3, the sealing device according to the present invention comprises an elastic ring 14 forming a single seal member held by first and a second fitting members 16 and 17 which are generally annular metal discs. The elastic ring 14 is made of an elastic material, e.g. rubber, and has on the inner periphery two seal lips 14a and 14b which are arranged to form V-shaped cross-section and directed in opposite direction, i.e. the seal lip 14a is directed inwardly toward the king pin 6 and the seal lip 14b is directed outwardly. As shown in FIG. 3, the seal lips 14a and 14b are arranged in contact with the spherical surface 2a of the trunnion socket 2 generally symmetrically with respect to a line n normal to the spherical surface 2a, and define, jointly with the spherical surface 2a, a grease filling space 15. The seal member 14 is formed as an endless ring and is secured to an end surface 5d of the knuckle flange 5a, which encloses the spherical surface portion 2a of the trunnion socket 2, through the first and second fitting members 16 and 17, spring washers 18 and bolts 19.

As shown in FIG. 3, the left end portion of the knuckle flange 5a has an end surface 5d, an annular recess 5b to accommodate the first fitting member 16 and the seal member 14, and a chamfered portion 5c at the corner between the end surface 5d and the recess 5b.

The first or inner fitting member 16 is formed to have a stepped portion 16a as shown in FIG. 3, which contacts with inner periphery 5e of the knuckle flange 5a to accurately position the seal member 14. The seal member is provided with an annular projection 14c to correspond with the stepped portion 16a of the first fitting member 16 to increase the thickness of the seal member 14 and to accurately position the seal member 14 radially. The base portion of the inner seal lip 14a is formed with an annular recess 14d to regulate flexibility of the sealing lip 14a.

As shown in FIG. 3, the second fitting member 17 is formed with a stepped portion 17b such that the inner end portion 17a of the member 17 projects inwardly (toward right in the figure). The outer surface of the seal member 14 is provided with generally semi-circular annular projections 14e, 14f and 14g to absorb deformation of the seal member 14 when the second fitting member 17 is urged to hold the seal member 14. Thus, the main body of the seal member 14 is prevented from excessive deformation, and the sealing property of the seal member 14 is improved. Annular projections 14f and 14g cooperate with the stepped portion 17b to prevent displacement of the seal member 14. An annular small projection 14h of the outer edge of the seal member 14 contacts with the chamfered portion 5c of the knuckle flange 5a to improve the sealing property at the outer periphery of the seal member 14.

Conventionally, the outer surface of the spherical surface portion 2a of the trunnion socket 2 is chromium plated. In place of the chromium plating, resin coating may advantageously be applied on the spherical surface to reduce manufacturing cost.

The sealing device according to the present invention is assembled to the knuckle flange 5a as shown in FIGS. 2 and 3, and the spaces 15 and 20 are fitted with grease.

The seal member 14 is an endless ring without a slit, and consists of elastic material, e.g. rubber. The two seal lips 14a and 14b which define a V-shaped cross-section elastically contact the spherical surface portion 2a of the trunnion socket 2. When the steering wheel, not shown, is operated to rotate the steering knuckle 5 about the king pins 6, the seal lips 14a and 14b slide along the spherical surface portion 2a so that the seal lip 14a prevents the grease in the space 20 from leaking outwardly, while the outside seal lip 14b prevents entry of the external foreign material, e.g. muddy water and leakage of the grease in the space 15. As the contact surfaces of the spherical surface portion 2a and the seal lips 14a and 14b are lubricated by the grease in the spaces 15 and 20, turnover or flutter of the contact edges of the seal lips is effectively prevented. The grease in the space 15 effectively prevents entry of foreign material and produces suitable sliding resistance between the spherical surface portion 2a and the seal member 14.

As described, the sealing device according to the present invention has improved sealing and wear resistant properties as compared with the conventional sealing device having a seal member made of felt. As the sealing device according to the invention has only one seal member, assembly is simplified. Since the second fitting member 17 is provided with the stepped portion 17b, the seal member 14 is effectively prevented from displacing or squeezing outwardly even when frictional force is generated between the lips 14a, 14b and the spherical surface portion 2a.

By forming the outer annular projections 14e, 14f and 14g of the seal member 14, deformation of the seal member 14 is limited, and clearances are left between the main body of the seal member 14 and the second fitting member 17 when the second fitting member 17 urges the seal member 14 inwardly to assemble the sealing device. Thus, deformation of the main body of the seal member is well absorbed by the clearances, so that the seal member 14 is held between the first and second fitting members 16 and 17 without impairing its flexibility and positioning of the seal lips 14a and 14b. The recess 14d of the seal member 14 regulates flexibility and elasticity of the inner seal lip 14a. The annular small projection 14h of the seal member 14 is urged against the chamfered portion 5c of the knuckle flange 5a to improve the sealing property between the inner periphery of the knuckle flange 5a and the outer periphery of the sealing member 14.

Further, the seal lip 14b is more rigid than the inner seal lip 14a by the increased thickness so that the seal lip 14b acts as a scraper to wipe off dust and mud accumulated on the outer surface of the spherical surface portion 2a of the trunnion socket 2.

What is claimed is:

1. In a sealing device including at least one annular seal member made of an elastic material which is held between axially spaced inner and outer fitting members, with the inside periphery of the seal member being in slidable contact with a spherical outer surface on an opposing member, the said annular seal member having at said inside periphery inner and outer axially spaced seal lips forming a generally V-shaped cross-section, which lips contact the outer spherical surface of the opposing member and cooperate therewith to define a space to be filled with grease, the improvement comprising said outer fitting member having a radially inner portion protruding axially inwardly toward said inner fitting member to thereby prevent said seal member from moving radially inwardly, said annular seal member being provided with at least two annular axial projections on its outer surface which contact said outer fitting member, one of said annular projections being in contact with the said axially inwardly protruding inner portion of said outer fitting member, said annular projections cooperating with said outer fitting member to define therebetween at least one space when said outer fitting member is urged against said seal member.

2. The sealing device as claimed in claim 1, wherein said annular seal member is surrounded by an external member having an inside surface formed with a chamferred portion adjacent to said outer fitting member, said seal member being provided on its outside peripheral surface with an annular projection which tightly contacts said chamferred portion.

3. The sealing device as claimed in claim 1 wherein one of said projections on the outer surface thereof is disposed adjacent to said projection on said outside peripheral surface.

4. The sealing device as claimed in claim 1 wherein a radially inner portion of said inner fitting member protrudes axially inwardly away from said outer fitting member to form a stepped portion, and a radially inner portion of said seal member has an increased thickness corresponding to the axial dimension of said stepped portion.

5. The sealing device as claimed in claim 4 wherein a recess is formed between the radially inner portion of said seal member and said inner seal lip.

6. The sealing device as claimed in claims 1 or 5 wherein the flexibility of said inner seal lip is higher than that of said outer seal lip.

7. The sealing device as claimed in claim 1 wherein said outer and inner seal lips are arranged symmetrically with respect to a line normal to the spherical surface of the opposing member.

8. The sealing device as claimed in claim 1 wherein a resin coating is applied to the spherical surface of the opposing member.

* * * * *